(12) United States Patent (10) Patent No.: US 7,737,853 B2
Moskowitz et al. (45) Date of Patent: *Jun. 15, 2010

(54) SYSTEM AND METHOD FOR DISABLING RFID TAGS

(75) Inventors: Paul Andrew Moskowitz, Yorktown Heights, NY (US); Robert J. von Gutfeld, New York, NY (US); Guenter Karjoth, Waedenswil (CH)

(73) Assignee: International Business Machines Corporation, Armonk, NY (US)

(*) Notice: Subject to any disclaimer, the term of this patent is extended or adjusted under 35 U.S.C. 154(b) by 314 days.

This patent is subject to a terminal disclaimer.

(21) Appl. No.: 11/836,059

(22) Filed: Aug. 8, 2007

(65) Prior Publication Data

US 2007/0285250 A1 Dec. 13, 2007

Related U.S. Application Data

(63) Continuation of application No. 10/946,975, filed on Sep. 22, 2004, now Pat. No. 7,277,016.

(51) Int. Cl.
*G08B 13/14* (2006.01)
(52) U.S. Cl. .................. 340/572.3; 340/572.7; 343/842
(58) Field of Classification Search .............. 340/572.1, 340/572.3, 572.7; 343/842
See application file for complete search history.

(56) References Cited

U.S. PATENT DOCUMENTS

| | | | |
|---|---|---|---|
| 3,713,148 A | 1/1973 | Cardullo et al. | |
| 4,728,938 A | 3/1988 | Kaltner | |
| 4,835,524 A | 5/1989 | Lamond et al. | |
| 6,025,780 A | 2/2000 | Bowers et al. | |
| 6,050,622 A * | 4/2000 | Gustafson | 340/572.1 |
| 6,181,248 B1 | 1/2001 | Fockens | |
| 6,317,028 B1 | 11/2001 | Valiulis | |
| 6,466,131 B1 | 10/2002 | Tuttle et al. | |

(Continued)

FOREIGN PATENT DOCUMENTS

EP 1010152 B1 4/2004

(Continued)

OTHER PUBLICATIONS

Elocity Inc., Friday's Stock Focus Alerts You on RFID Technology, GlobeNewswire, Apr. 16, 2004.

(Continued)

*Primary Examiner*—Thomas J Mullen
(74) *Attorney, Agent, or Firm*—Cantor Colburn LLP; Vazken Alexanian

(57) ABSTRACT

The invention provides protection to wireless portable transponders from unauthorized interrogation by employing a mechanical means for disabling reception by or from the antenna of the transponder. Transponders include RFID tags that are attached to items that a persons may purchase or carry. Such transponders generally have means for receiving and storing electronic and other information, commonly in binary form using memories as in electronic circuits, etc. The invention is designed to provide privacy of electronic information. The tags can be protected from receiving or providing unauthorized or unwanted information. The invention provides the mechanical means that permit the owner to decide when reception/interrogation of personal or other information is not desired by employing the provided mechanical disable control means.

7 Claims, 5 Drawing Sheets

U.S. PATENT DOCUMENTS

| | | | |
|---|---|---|---|
| 6,535,175 | B2 | 3/2003 | Brady et al. |
| 6,781,508 | B2 | 8/2004 | Tuttle et al. |
| 6,796,508 | B2 * | 9/2004 | Muller ..................... 235/492 |
| 6,995,652 | B2 | 2/2006 | Carrender et al. |
| 7,034,689 | B2 * | 4/2006 | Teplitxky et al. ......... 340/572.7 |
| 7,098,794 | B2 * | 8/2006 | Lindsay et al. ........... 340/572.3 |
| 7,253,734 | B2 | 8/2007 | Moskowitz |
| 7,277,016 | B2 * | 10/2007 | Moskowitz et al. ...... 340/572.3 |
| 2002/0117543 | A1 | 8/2002 | Kocznar et al. |
| 2004/0189470 | A1 * | 9/2004 | Girvin et al. ............. 340/572.8 |
| 2005/0128087 | A1 * | 6/2005 | Claessens et al. ........ 340/572.3 |
| 2006/0017545 | A1 * | 1/2006 | Volpi et al. ................ 340/10.4 |

FOREIGN PATENT DOCUMENTS

| | | |
|---|---|---|
| FR | 2863748 | 12/2003 |
| WO | 02077939 A1 | 10/2002 |
| WO | 02084584 A1 | 10/2002 |
| WO | 2005062247 A1 | 7/2005 |

OTHER PUBLICATIONS

EnXnet's Emerging Technology Solves Privacy Concerns, Business Wire, Apr. 15, 2004, Oklahoma, US.

Business Wire, [online]; [retrieved on Nov. 18, 2009]; retrieved from the Internet http;//www.boston.com "EnXnet's RFID Deactivation Device Vital Role in the Consumer Marketplace", Business Wire, Apr. 20, 2004.

RFID, [online]; [retrieved on Nov. 18, 2009]; retrieved from the Internet http;//www.rfdjournal.com/article/articleprint/585/-1/1 "NCR Prototype Kiosk Kills RFID Tags", RFID Journal, Sep. 25, 2003.

STMicroelectronics, [online]; [retrieved on Nov. 18, 2009]; retrieved from the Internet http://www.st.com/stonline/press/news/year2004/p1462m.html "SRMicroelectronics Launches UHF RFID Chip Fully Supporting EPCglobal Class 1 Specification".

Ari Juels et al., The Blocker Tag: Selective Blocking of RFID Tags for Consumer Privacy, CCS, Oct. 27-30, 2003, Washington, DC, US.

* cited by examiner

SYSTEM AND METHOD FOR DISABLING RFID TAGS

This application is a continuation of U.S. patent application Ser. No. 10/946,975 (now U.S. Pat. No. 7,277,016) Sep. 22, 2004 to which priority is claimed and which is incorporated herein by reference in its entirety.

FIELD OF THE INVENTION

The present invention is related to providing wireless portable transponders, such as cards and RFID tags, with user controlled means for disabling the tags as protection from an unauthorized interrogation. More particularly, the invention provides mechanical means that permit a user to decide to disable a tag and observe that the tag has been effectively disabled when transponder reception/interrogation of personal or other information is undesirable.

BACKGROUND OF THE INVENTION

Portable transponders, employ RFID, Radio Frequency Identification, as the technology used to collect highway tolls, to serve as personal identification for access control, and to provide means for electronic information interchange, such as credit, etc. Passive RFID tags (i.e. tags without internal power sources such as batteries) and wireless cards contain chips, (also known as computer chips, microchips, memory chips) which store identification and other information, such as credit card numbers, financial data, etc. Tags may be applied to items to identify the item in much the same way that bar codes are used for identification purposes. Information is retrieved from a tag as well as the wireless cards of the present invention by an RFID base station or reader when the tag or card is scanned with radio waves by the reader. The tags may draw their power to function from the interrogation field supplied by the base (read/write) station.

Passive tags are described in U.S. Pat. No. 3,713,148, Card Apparatus and System, issued to Cardullo and Parks. In its simplest form the RFID tag or device includes a circuit, typically a silicon chip, although more than one chip may be used in the construction of the RFID device.

The circuit is generally connected to an antenna. The RFID device or card may take on a variety of forms including that of a tag, a key fob, or a card. As previously mentioned, a battery may also be employed to extend the range of the device. It is also possible in principle to build devices that function as tags or wireless cards using electrical circuits including only resistors, capacitors and inductors as is well known by those skilled in the art.

Large scale retailers and their suppliers are pursuing Radio Frequency Identification, RFID, tagging for supply chain tracking of goods. Demonstrations of RFID for item tagging will lead to point of sale check out and data collection. For the item tagging application, RFID tags are attached to some part of an item that is being inventoried or is for sale. The attachment may be such that the tag is not visible since the tag may be placed within a container section of the item or packaging material of the item. Removal of the tag after it is no longer useful can become difficult if not impossible for many practical situations. Thus, the tag will in many cases remain attached to the item that has been sold to a customer. This makes it possible for the tag to be read after the point of sale. This in turn leads to a question of the privacy of the purchaser or customer. The issue of privacy is of utmost concern. It is therefore desirable under some circumstances to deactivate or disable the RFID tag after the point of sale without having to physically remove the tag. Deactivation of the tag is one way to assure privacy.

Temporary deactivation of tags may not satisfy privacy concerns. RFID protocol proposals 9 include a kill command that renders the tag inoperable. This kill command is often referred to as a "Privacy" command—which can be used to permanently deactivate the device at the end of its working life, for example as a customer leaves a store. However, there are two problems associated with the kill command. First, the execution of a kill command is only protected by a short password, 8 bits for example. Organizations using RFID tags are therefore concerned that unauthorized people may (easily) be able to deactivate them even before point of sale. Second, consumers are afraid that the kill command may not permanently "destroy" a tag. The entity who made the tag may also have means to reactivate it.

SUMMARY OF THE INVENTION

An aspect of the present invention, is to provide transponder information exchange privacy and control by providing tag structures that make it possible for a user to mechanically alter the tag in such a way so as to inhibit the ability of a base station or reader to interrogate the RFID tag or transponder by wireless means for those tags that are readily accessible by the holder of the tagged item.

It is also the aim of this invention to provide a system and method for the permanent deactivation or disabling of wireless RFID tags unless electromechanical means are undertaken to reactivate. Such reactivation would require deliberate actions on the part of the owner of the RFID tag to permit the reactivation to take place and could not be undertaken without the owners knowledge unless the item were either stolen or deliberately left unattended. It is further the aim of this invention to provide a system and method for the visual confirmation that a tag has been deactivated.

Another aspect of the present invention, is to enable a holder of a card to protect his/her privacy by deactivating the RFID tag at will, while also making it possible for an establishment to interrogate the tag at the holder's discretion by means of mechanical probing.

In order to utilize the methods of disabling to be described we also require a method for manufacturing a wireless RFID tag where these disabling techniques to be described can be utilized. The manufacturing method consists in the assembly of a memory chip with an externally accessible antenna connected to the chip. The chip and antenna are mounted on some mounting means such as a non-electrically conducting substrate. The antenna is coupled to the memory chip by way of an electrical conductor passing through an exterior portion of the substrate and at least a portion the externally mounted antenna and the antenna connection in the form of an electrical conductor can be mechanically removed when it is desired to disable interrogation of said RFID tag.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

Figure 1:
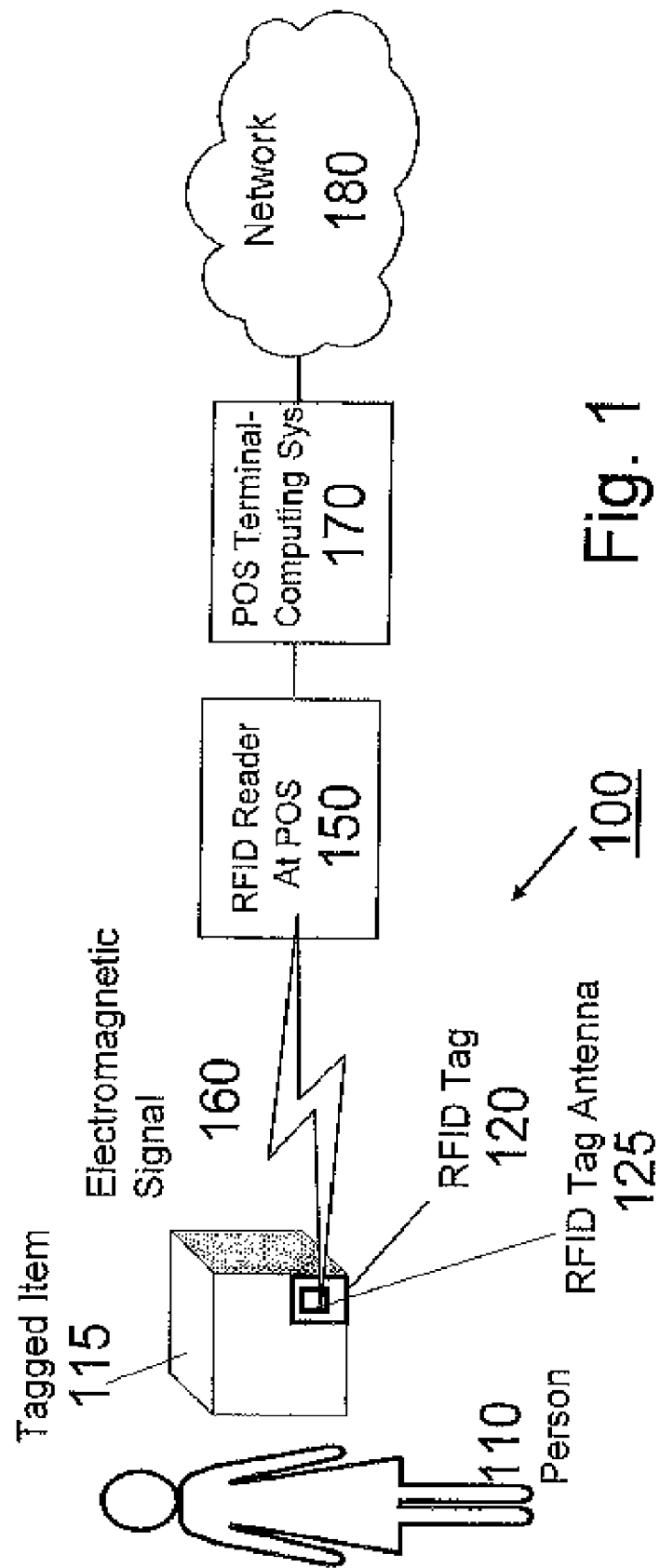
FIG. 1 illustrates an example of a system of the invention.

The present invention provides methods, systems and apparatus to protect wireless transponders, such as RFID tags that may be carried on a person, from an unauthorized interrogation. Such tags have means for receiving and storing electronic information, commonly in binary form using memories and/or electronic circuits, typically, but not exclusively such as chips containing 'bits' to store the information. The invention is designed to provide privacy of this type of electronic information and yet permit the information to be queried later through mechanical or ohmic contact at the users discretion. At the same time the tags can be protected from receiving unauthorized or unwanted information. The invention provides means that permit a user, generally the owner, to decide when reception/interrogation of this personal information is desirable by simple mechanical means. The disabling of the tag to prevent interrogation of the RFID consists in physically damaging at least a portion of an interrogation circuit in said RFID tag FIG. 1, illustrates a system of the invention 100. A person or cardholder 110 carries at least one tagged item 115 which has at least one wireless or RFID tag 120 attached to the item 115, the card being interrogated by an RFID reader 150 which may be located at a point-of-sale, POS, terminal, the reading transmitted to a computing network. The RFID tag has an antenna 125 connected to a chip on the tag which provides a means for communication to the chip. The card may be read through the use of an electromagnetic, EM, signal 160 that provides means for communication between the tag 120 and a reader 150. Information received by the reader 150 may be transferred to a computing system 170 where it is processed and stored in a database. The system 170 may in turn be connected to a network 180 which makes possible the exchange of information with other computing systems. In order to protect the privacy of the person 110, the tag 120 is constructed with a built in means for separating the antenna from the chip. Thus, the user may mechanically and electrically disconnect the antenna from the chip.

Figure 2:
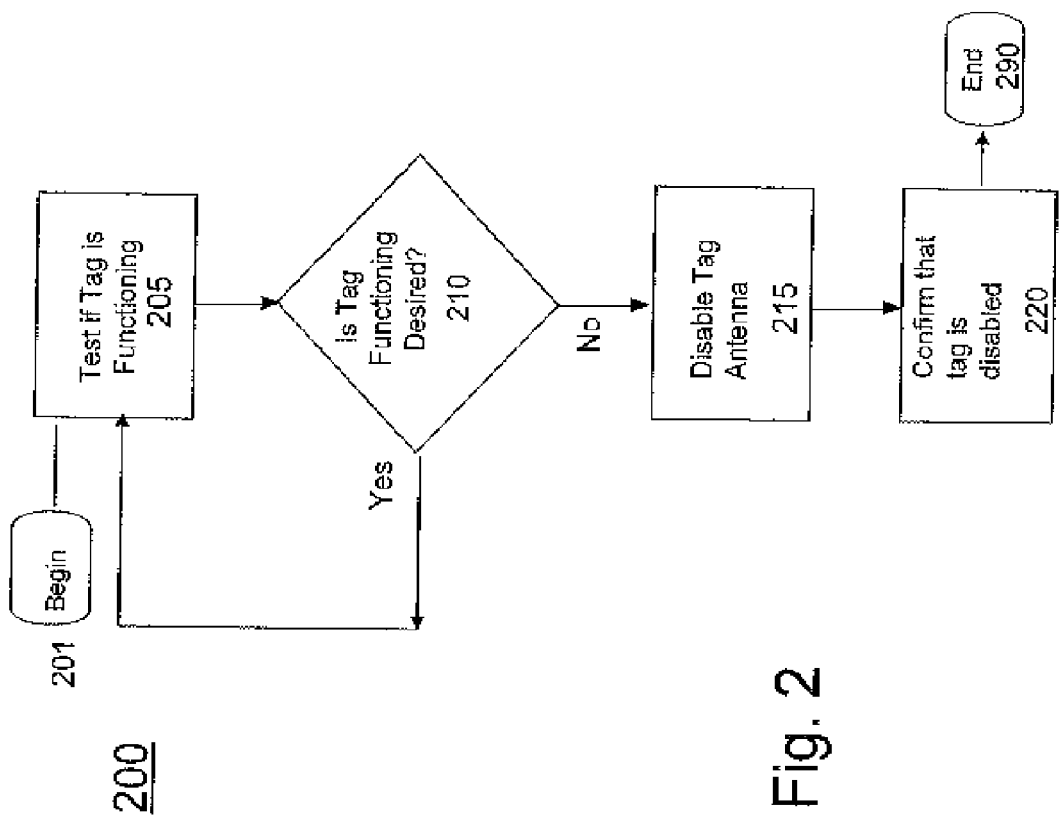
FIG. 2 shows a flow diagram illustrating a disabling function.

FIG. 2 shows a flow diagram 200 illustrating the disable function. In order to be able to assure a consumer that a tag has been deactivated, we provide a method, FIG. 2, wherein there is confirmation of the deactivation of an RFID tag by physical inspection or electronic confirmation. Tags are deactivated by the physical destruction of the tag antenna. This is accomplished by means that are familiar to consumers. Alternatively, tags can be destroyed by destruction of the wiring that is attached to the antenna for those case where the wiring is accessible to the customer.

In the normal state of use for a tag, the tag is functioning and may be confirmed to be functioning by means of a test 205. The test may consist of placing the tag within the field of an RFID reader, and then using the RFID reader to read information held in the memory of the chip on the RFID tag. If continued functioning is desired 210, no more is done. If the functioning is not desired 210, e.g. the user wishes that the tag may not be read by wireless means, the antenna is disabled 215. The disabling of the antenna is accomplished by mechanical means as described in the figures below. Additionally, the disabling of the antenna function may be confirmed by visual inspection. After the tag is disabled, the disabling may be confirmed by means of a test However, visual inspection is the preferred method to determine the tag has been disabled.

Alternatively, if the object is simply to have the tag disabled, there is no need to first test to see if the tag is enabled. Rather, the mechanical disconnection of the antenna connection to the chip or the mechanical destruction of the antenna itself is adequate to assure that wireless radio signals will not be received and will not be conveyed to the chip. This will disable the tag. The disconnection may be confirmed by visual inspection.

Figure 3:
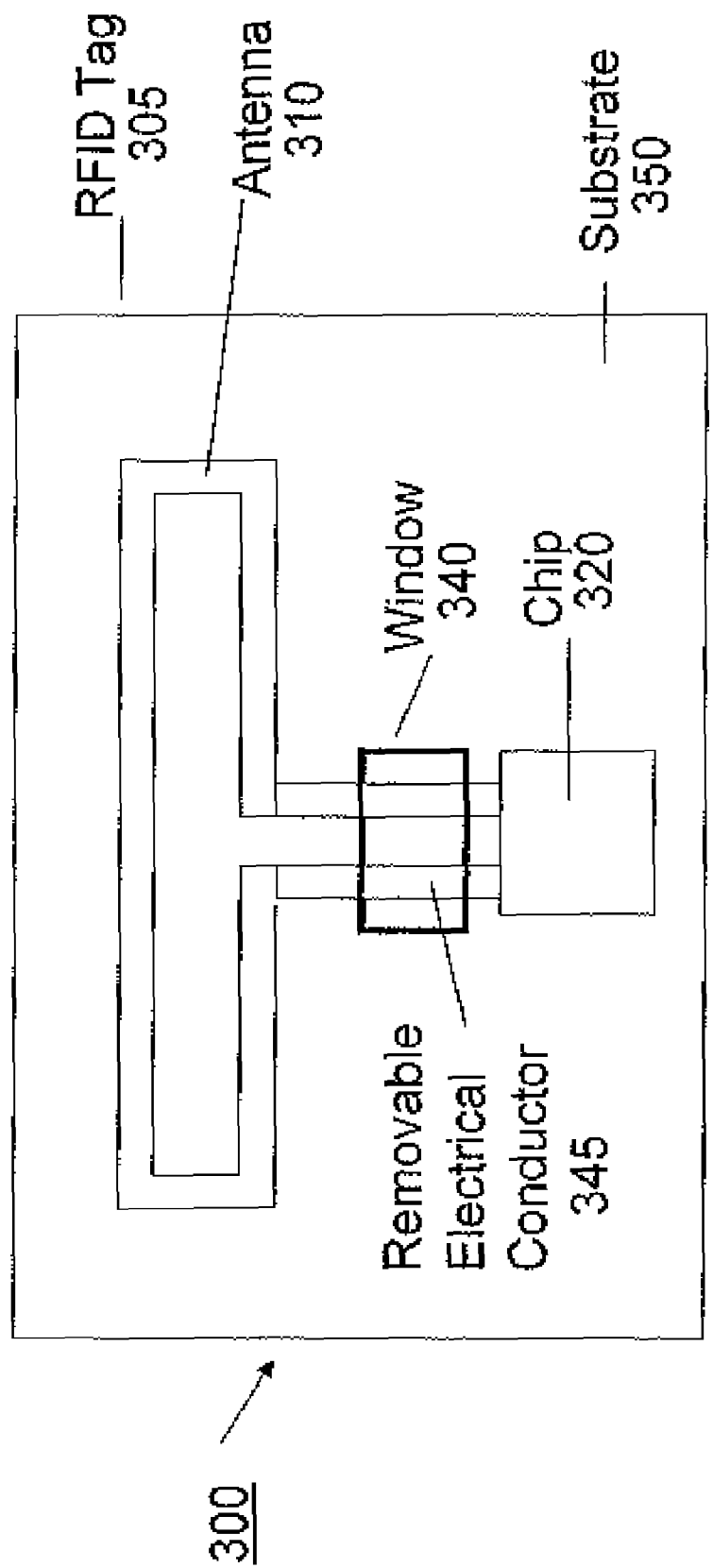
FIG. 3 is an example of an RFID tag, whose antenna is constructed of a scratch-off conducting material.

FIG. 3 is an example of an RFID tag that may be disabled by a mechanical means 300. In this embodiment, the antenna is constructed of conducting "scratch-off material". Such material is familiar to consumers in its use to obscure printed material on lottery tickets. Behm et. al. describe the use of such material to construct scratch-off circuits to use in lottery ticket applications, U.S. Pat. No. 5,599,046, and document verification, U.S. Pat. No. 5,997,044, herein incorporated by reference. Ask, France, (http://www.ask.fr/uk/technology/ask_technology.html) is a company that manufactures printed conducting circuits In our system, the antenna 310 of the RFID tag 305 is manufactured upon a substrate 350 using the scratch off material. The substrate 350 or mounting means may be a plastic material such as polyimide or polyester. The chip 320, also called a memory chip, is mounted on the substrate and is connected to the antenna 310 by an electrical conductor or conductors 345. The RFID tag is manufactured in such a way that some or all of the antenna or its connecting wiring is exposed. The electrical conductor or conductors 345 pass through a window 340, e.g. an exterior portion of the substrate or mounting means. For instance, an open window 340 in a covering substrate may be built into the tag at or in the region of the connection of the antenna 310 to the chip 320. Such tags are placed on the article or on its packaging in such a way that the antenna or the antenna chip connection may be scratched-off using a coin, a fingernail, or other such object. Thus, the consumer or a check-out attendant in a retail establishment, may perform the scratch-off operation to disable interrogation of the tag. The tag is open for visual observation for the confirmation of the disabling of the tag.

Figure 4:
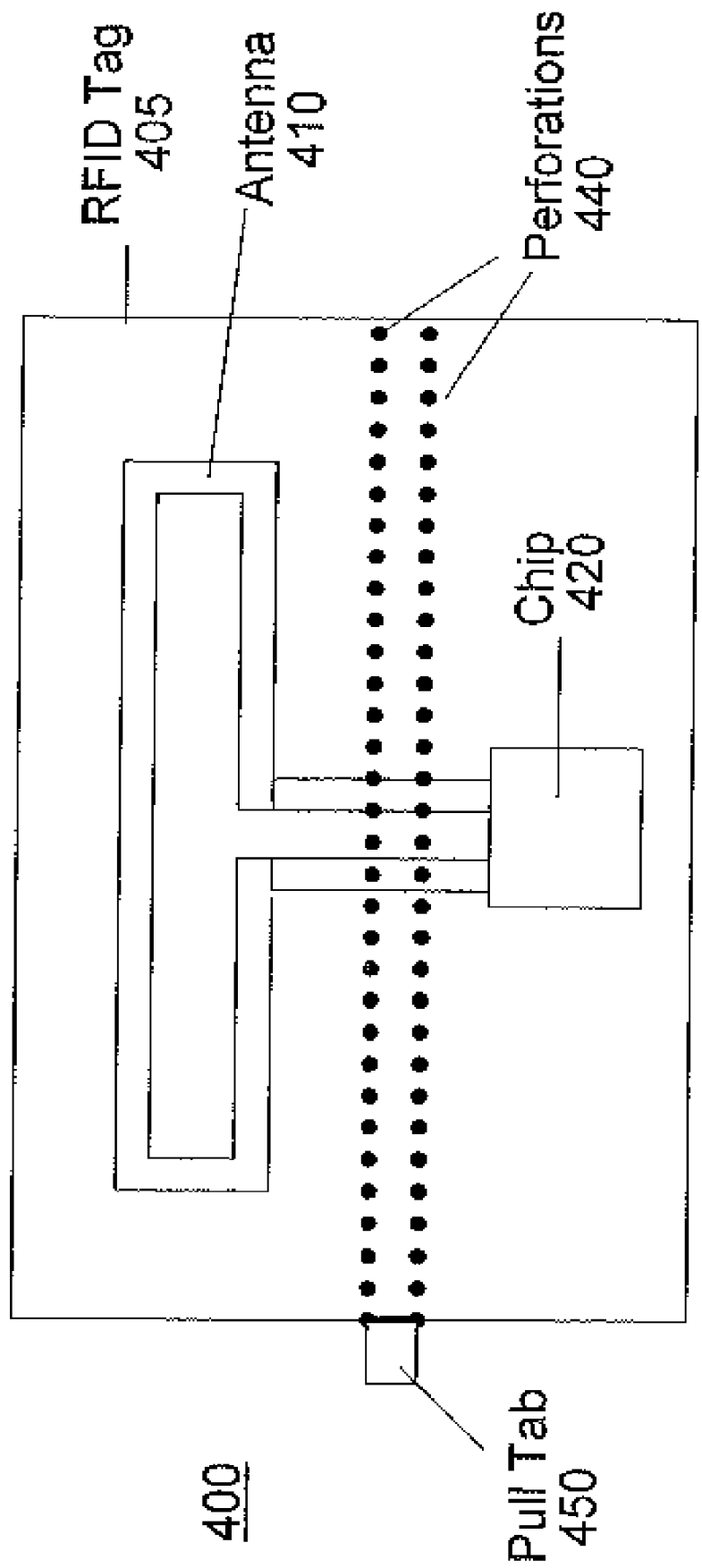
FIG. 4 shows an RFID tag in which the antenna may be disconnected by mechanical means.

FIG. 4 shows a second embodiment 400. Perforations 440 such as those used to enable the separation of postage stamps from each other are manufactured into the antenna and its substrate in such a manner that a separation along a line of perforations, separates the antenna 410 from the chip 420, or a sufficient portion of the antenna from itself so as to disable the RFID tag 405. A single or double line of perforations may be designed into the structure. A pull tab 450 may be added to facilitate the separation. In this embodiment a double line of perforations is employed. Thus, the consumer or a check-out attendant in a retail establishment, may perform the separation operation to disable the tag. The tag is open for visual observation for the confirmation of the disabling of the tag. There may also be an auxiliary specialized reader in the retail establishment to give additional confirmation that the tag has been destroyed or permanently disabled. Here, the customer can place the item with the tag within the reading range of the special reader to further ascertain that the tag can no longer be read. This reader could simply give a signal such as a continuous blinking light or the like to indicate that the tag which is within the proper range of the special reader is not sending back a signal, i.e. is not being read.

Figure 5:
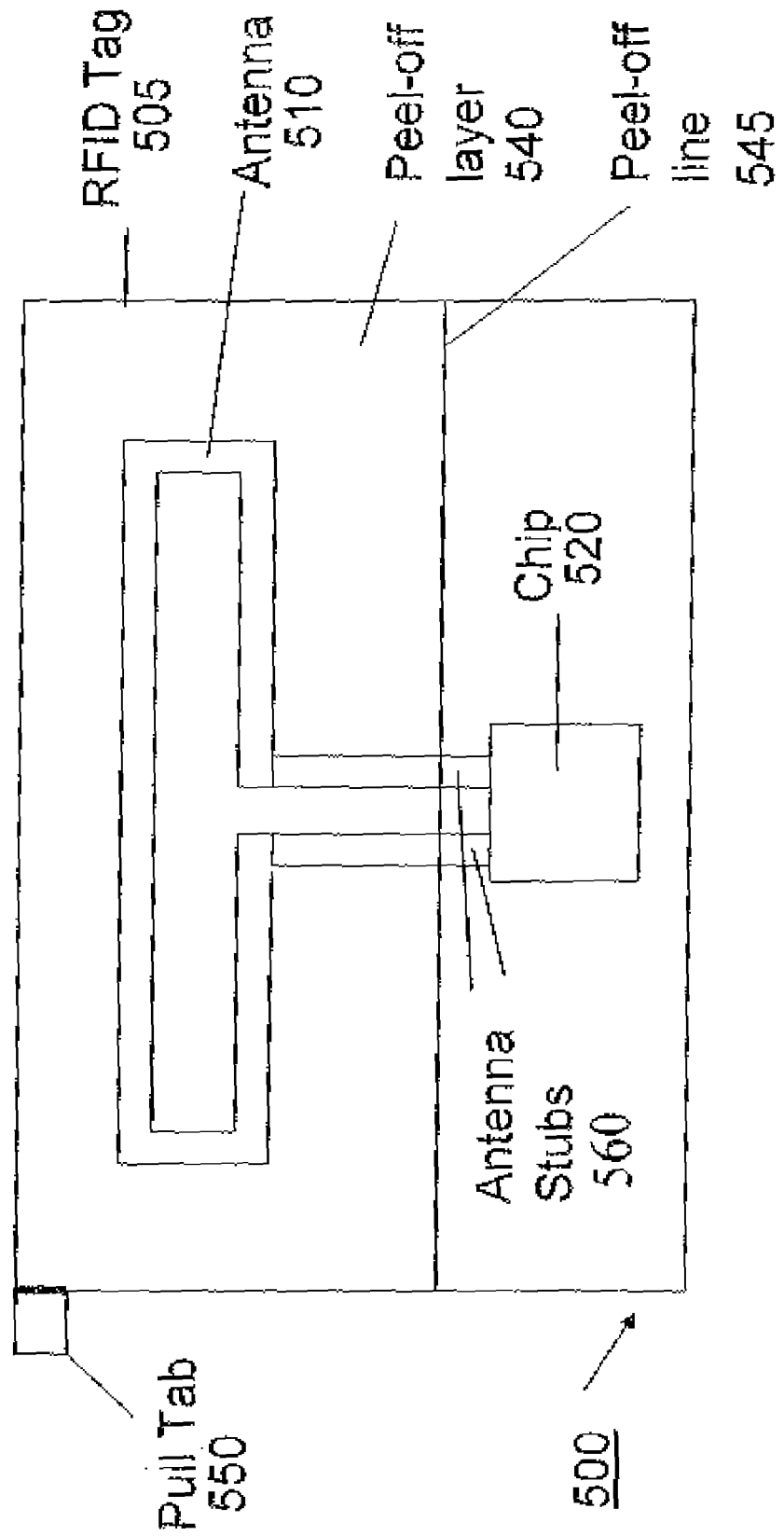
FIG. 5 shows an RFID tag in which the antenna may be removed by mechanical means.

FIG. 5 shows a third embodiment 500. The antenna 510 or portion of the antenna is sandwiched between two layers of packaging material. The sandwich is manufactured in such a manner that the adhesion of the antenna to the upper layer of the packaging material is greater than its adhesion to the lower layer which in turn is affixed to the purchased item. This produces a peel-off layer 540 affixed by an adhesive material or layer to the antenna The antenna is removed or destroyed, e.g. delaminated, by pulling the upper layer of material from the tag 505, removing the antenna with it. A pull tab 550 is connected to the upper layer of packaging is used to facilitate the delamination process. The tag may be designed in such a way that only a portion of the antenna is removed, the portion that is above the peel-off line 545. This leaves a pair of short antenna lines, or stubs, 550 attached to the chip 520.

Another method for disabling the tag is one where the antenna is formed on a decal with the ends of the antenna in electrical contact with the connecting stubs. Removal of the decal removes the antenna thereby disabling the chip from receiving any wireless radio frequency communication.

Under normal circumstances, the above mentioned methods of removing all or a portion of the antenna would disable the functioning of the antenna and thus the functioning of the RFID tag or transponder in such a way that interrogation of the tag by wireless means is no longer feasible. However, the remaining short antenna stubs 550 may be electrically contacted by mechanical probes (the probes electrically connected to one another) allowing the reading of the tag through an ohmic contact directly to the stubs. These probes may have sharp or sharpened ends in order to pierce any thin protective layer overlaying the portion of the antenna or stubs still remaining after previous disablement, i.e. resulting from tearing off or destroying the major portion of the antenna as previously described. Thus, even if a tag is disabled from a wireless point-of-view, a consumer may allow the tag to be read, for example, by a retail establishment when an item that the tag is attached to is returned for a refund or credit. Again, the successful disabling of the tag may be confirmed by visual inspection or through use of the auxiliary reader described above.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method for manufacturing a wireless RFID tag, said method comprising:
   providing a memory chip, an antenna, and a mounting means for mounting the memory chip and said antenna; and
   coupling said memory chip to said antenna with an electrical conductor passing through an exterior portion of said mounting means, at least a portion of said electrical conductor being removable when it is desired to disable interrogation of said RFID tag.

2. A method as recited in claim 1, further comprising removing said at least a portion of said electrical conductor to disable interrogation of said RFID tag.

3. A method as recited in claim 2, further comprising reconnecting said at least a portion of said electrical conductor to enable interrogation of said RFID tag.

4. A method as recited in claim 1, further comprising: removing said at least a portion of said electrical conductor to disable interrogation of said RFID tag, such as to leave electrical stubs having an electrical connection to the memory chip.

5. A method as recited in claim 4, further comprising connecting an external antenna to said stubs to re-enable interrogation of said RFID tag.

6. A method as recited in claim 5, wherein said step of connecting comprises adhering a decal having an electrical circuit making contact with at least one of said stubs to complete an antenna circuit.

7. A method as recited in claim 6, wherein said decal comprises said external antenna.

* * * * *